(12) United States Patent
Welker et al.

(10) Patent No.: US 7,837,076 B2
(45) Date of Patent: Nov. 23, 2010

(54) COMBINATION BACKPACK AND GRANULAR MATERIAL DISPENSER

(75) Inventors: Kyle Welker, Sugar Land, TX (US); Brian H. Welker, Sugar Land, TX (US)

(73) Assignee: Welker Wildlife Equipment, Inc., Sugar Land, TX (US)

( * ) Notice: Subject to any disclaimer, the term of this patent is extended or adjusted under 35 U.S.C. 154(b) by 975 days.

(21) Appl. No.: 11/626,078

(22) Filed: Jan. 23, 2007

(65) Prior Publication Data

US 2008/0173685 A1    Jul. 24, 2008

(51) Int. Cl.
A45C 15/00    (2006.01)
(52) U.S. Cl. .................. 224/576; 239/152; 239/154; 222/130; 222/175
(58) Field of Classification Search ............. 224/576; 222/130, 175, 517, 557, 576; 239/152–154, 239/650, 653, 658, 663, 681
See application file for complete search history.

(56) References Cited

U.S. PATENT DOCUMENTS

| 260,373 | A |   | 7/1882 | Erwin |
| 967,096 | A |   | 8/1910 | Wood |
| 1,524,585 | A | * | 1/1925 | Shutterly ............ 222/236 |
| 1,793,197 | A |   | 2/1931 | Speicher |
| 2,599,118 | A |   | 6/1952 | McMillan |
| 3,603,482 | A |   | 9/1971 | Shelton |
| 4,154,367 | A | * | 5/1979 | Hanson et al. ............ 222/130 |
| 4,334,601 | A |   | 6/1982 | Davis |
| 5,339,994 | A |   | 8/1994 | Nuila |
| 5,429,305 | A | * | 7/1995 | Munsey ............ 239/152 |
| 5,503,090 | A |   | 4/1996 | Guzan |
| 5,630,537 | A |   | 5/1997 | Sciacca |
| 5,772,075 | A | * | 6/1998 | Ash et al. ............ 222/1 |
| 6,015,072 | A |   | 1/2000 | Young |
| 6,089,477 | A |   | 7/2000 | Dillon |
| 6,189,750 | B1 |   | 2/2001 | Von Neumann |
| 6,401,890 | B1 |   | 6/2002 | Tan |
| 6,592,012 | B2 |   | 7/2003 | Godshaw et al. |
| 6,729,558 | B1 |   | 5/2004 | Seenauth |
| 2004/0031864 | A1 |   | 2/2004 | Johnston |

* cited by examiner

Primary Examiner—Nathan J Newhouse
Assistant Examiner—Adam Waggenspack
(74) Attorney, Agent, or Firm—Husch Blackwell LLP

(57) ABSTRACT

A combination backpack and granular material dispenser that includes an upper compartment, a lower compartment extending downwardly from the upper compartment, at least one carrying strap, a valve assembly, and a valve assembly actuator. In use, the present invention enables a user to stow equipment and personal items in the upper compartment while stowing and dispensing a granular material from the lower compartment. The lower compartment is collapsible into and expansible from the upper compartment.

15 Claims, 4 Drawing Sheets

COMBINATION BACKPACK AND GRANULAR MATERIAL DISPENSER

CROSS-REFERENCE TO RELATED APPLICATIONS

None.

BACKGROUND OF THE INVENTION

Wildlife enthusiasts, photographers, landowners, and hunters have long dispersed animal feed to attract and keep animals in a particular area. More specifically, where it is legal, big game hunters often disperse animal feed near their blinds or tree stands prior to and/or during the hunting season. Often, where it is legal, hunters will also disperse animal feed around their blinds or tree stands while walking from their vehicles to their blinds or tree stands.

While out on a hunt, hunters generally bring a number of personal items with them such as binoculars, knives, range finders, ammunition, and food. Because of the number of items and the bulkiness of the items, hunters often bring the items in a backpack or bag.

Accordingly, a need exists for a combination backpack and granular material spreader that can be used to stow a hunter's personal items as well as disperse animal feed.

SUMMARY OF THE INVENTION

The present invention is directed to a combination backpack and granular material dispenser that includes an upper compartment, a lower compartment extending downwardly from the upper compartment, at least one carrying strap, a valve assembly, and a valve assembly actuator.

The present invention is also directed to a granular material dispensing backpack that includes a means for securing the backpack to a user's back, a means for stowing items in an upper compartment of the backpack, a means for stowing a granular material in a lower compartment of the backpack, a means for dispersing the granular material from the lower compartment, a means for actuating the dispersal of the granular material, and a means for collapsing and securing the lower compartment to a bottom section of the upper compartment.

Additionally, the present invention is directed to a method for dispersing a granular material from a backpack that includes the steps of securing the backpack to a user's back, stowing items in an upper compartment of the backpack, stowing a granular material in a lower compartment of the backpack, actuating the dispersal of the granular material, dispersing the granular material, and controlling the rate of dispersal of the granular material.

DETAILED DESCRIPTION OF THE INVENTION

The present invention is directed to a combination backpack and granular material dispenser 10 for stowing equipment and personal items and/or dispensing granular material 116. The stowing and dispensing can occur simultaneously or independent from one another.

Figure 1:
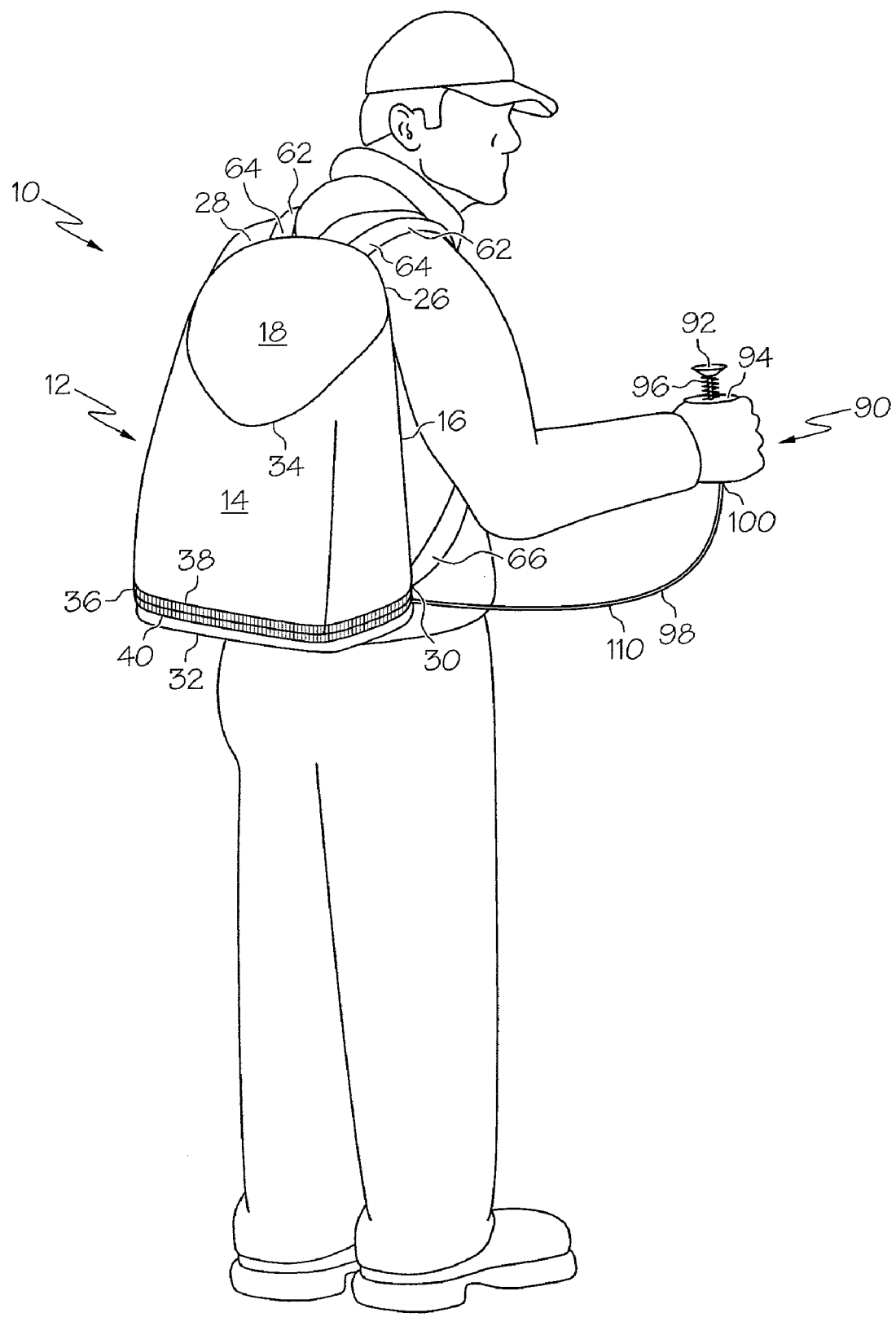
FIG. 1 is a front perspective view of a combination backpack and granular material dispenser showing the lower compartment in a collapsed position in accordance with one embodiment of the present invention.
Figure 2:
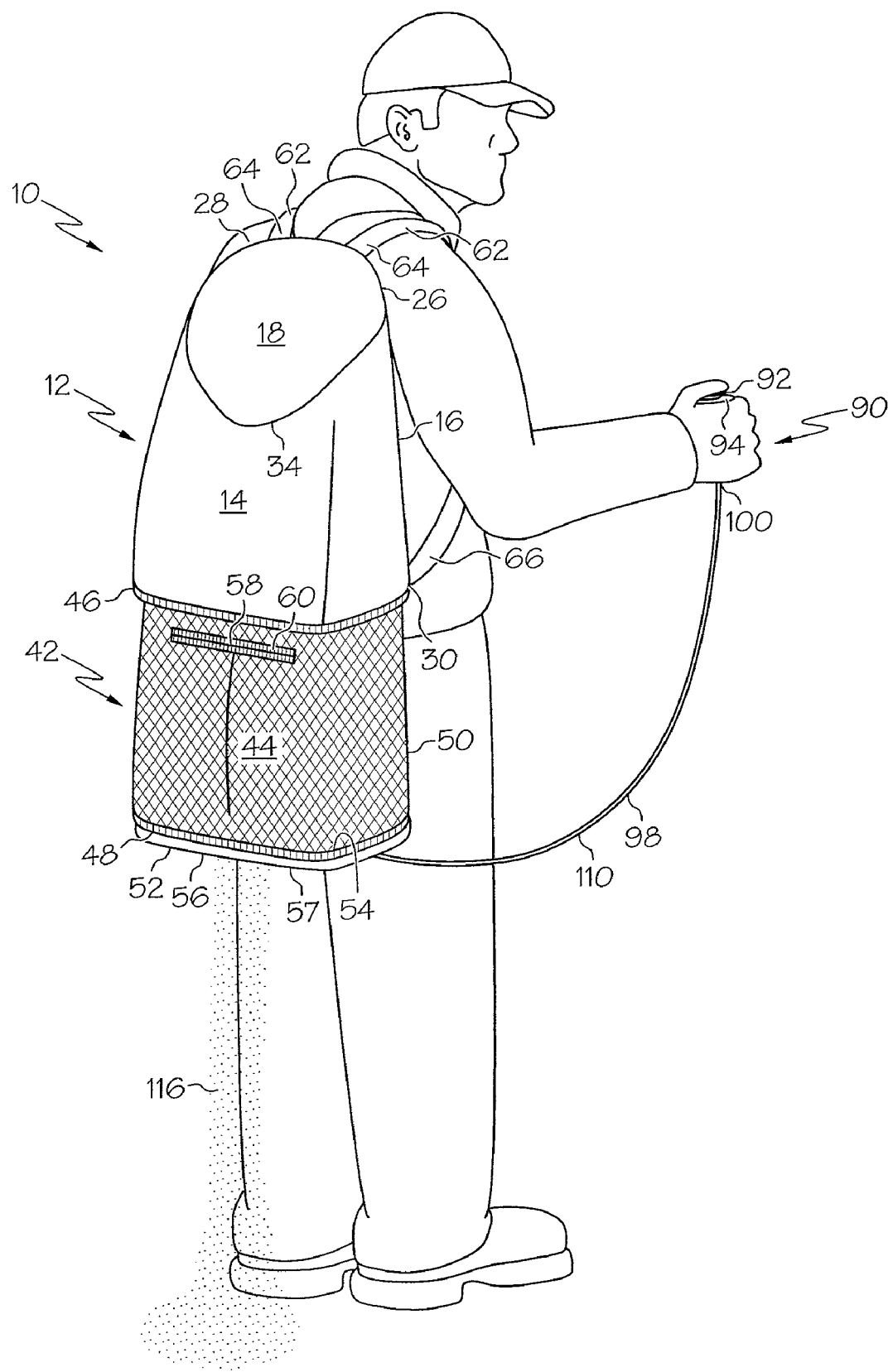
FIG. 2 is a front perspective view of a combination backpack and granular material dispenser showing the lower compartment in an expanded position in accordance with one embodiment of the present invention.
Figure 3:
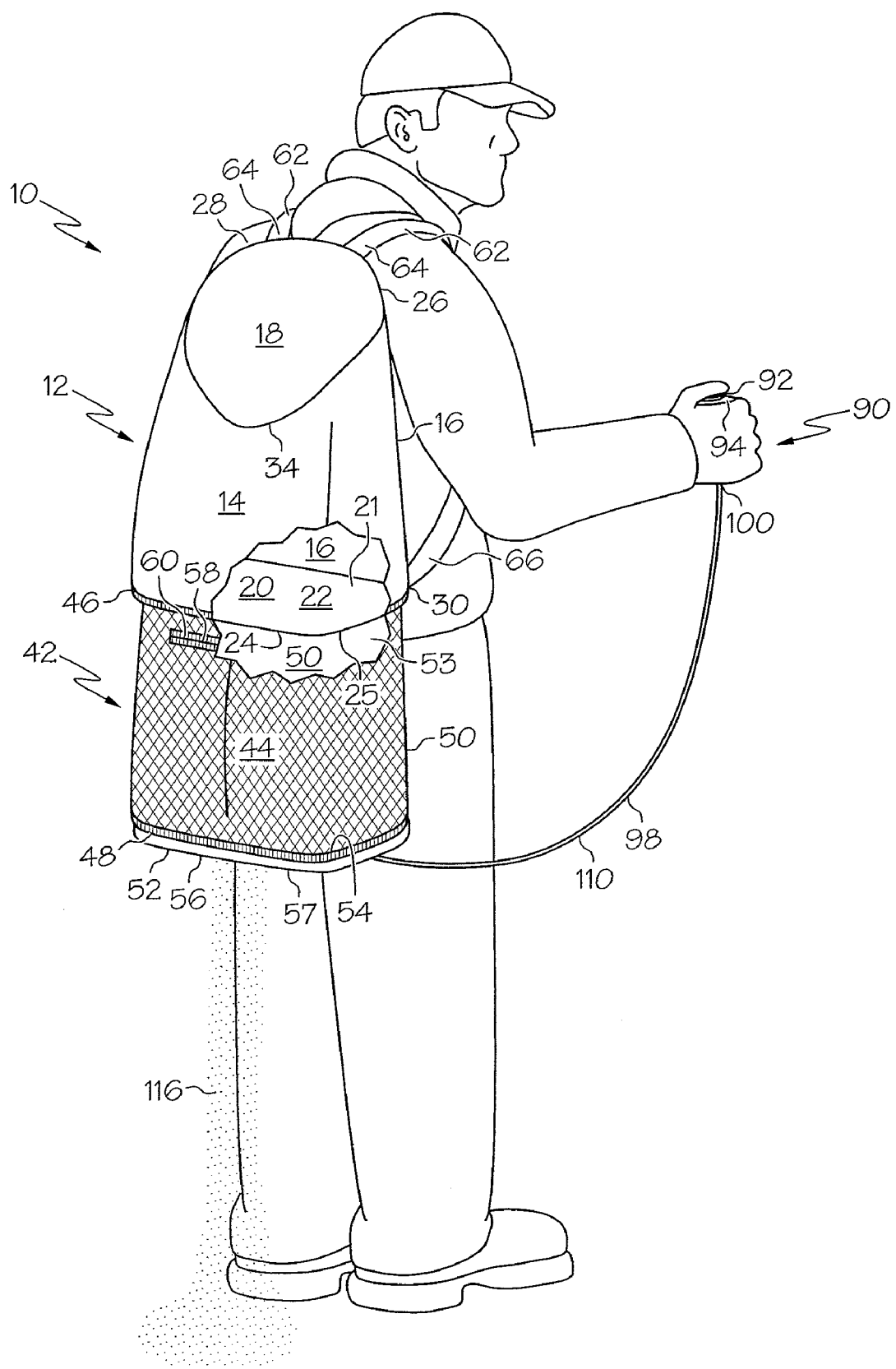
FIG. 3 is a front perspective sectional view of a combination backpack and granular material dispenser showing the lower compartment in an expanded position in accordance with one embodiment of the present invention.

The combination backpack and granular material dispenser 10 includes an upper compartment 12, a lower compartment 42, at least one carrying strap 62, a valve assembly 68, and a valve assembly actuator 90. As shown in FIGS. 1-3, the upper compartment includes a front section 14, a back section 16, a top section 18, and a bottom section 20 defining a substantially hollow interior 21 therein configured for the stowing of items. As shown in FIG. 3, the upper compartment bottom section 20 includes a top surface 22, a bottom surface 24, and an edge 25 extending around its periphery. The upper compartment back section 16 includes an upper right corner 26, an upper left corner 28, a lower right corner 30, and a lower left corner 32. The upper compartment top section 18 selectively opens and closes. When in an open position, the upper compartment top section 18 defines an opening 34 for placing items in and removing items from the upper compartment 12. The upper compartment also includes a fastener (not shown) for securing the upper compartment top section 18 in a closed position. The fastener (not shown) may be selected from the group consisting of zippers, hooks and loops, buttons, snaps, buckles, pins, clamps, combinations thereof, or any other fastener suitable for use in the present invention now known or hereafter developed.

FIGS. 1-3 show an embodiment of the invention that includes two carrying straps 62 configured to be worn over the shoulders of a user. It will be appreciated by one skilled in the art that the carrying straps 62 can be in a configuration allowing the combination backpack and granular material dispenser 10 to be secured to the user's torso, secured to the user's waist, held by the user's hands or arms, or in any other configuration suitable for the present invention. The carrying straps 62 each have a first end 64 and a second end 66. In this embodiment, the carrying straps 62 are affixed to the upper compartment back section 16 such that the first end 64 of one of the carrying straps 62 is affixed to the upper compartment back section 16 proximate the upper right corner 26 and the second end 66 affixed to the upper compartment back section 16 proximate the lower right corner 30. The other carrying strap 62 has a first end 64 affixed to the upper compartment back section 16 proximate the upper left corner 28 and a second end 66 affixed to the upper compartment back section 16 proximate the lower left corner 32. It will be appreciated by one skilled in the art that the at least one carrying strap 62 can be affixed to any section of the backpack suitable for the present invention.

The lower compartment 42 is collapsible into and expansible from the upper compartment 12. As shown in the embodiment contained in FIGS. 1-3, the lower compartment 42 is collapsible into and expansible from the upper compartment bottom section 20. As shown in FIGS. 2-3, the lower compartment includes a front section 44, a back section 50, and a bottom section 52 defining a substantially hollow interior 53 configured to receive granular material therein. The upper compartment bottom section 20 acts as the top of the lower compartment 42 with the upper compartment bottom section top surface 22 being part of the upper compartment 12 and the upper compartment bottom section bottom surface 24 being part of the lower compartment 42. The lower compartment front section 44 includes a top edge 46 and a bottom edge 48. The lower compartment bottom section 52 includes a top surface 54, a bottom surface 56, and an edge 57 extending around its periphery.

The combination backpack and granular material dispenser 10 also includes a fastener 36 that retains the lower compartment 42 in a collapsed state. The fastener 36 may be selected from the group consisting of zippers, hooks and loops, buttons, snaps, buckles, pins, clamps, combinations thereof, or any other fastener suitable for use in the present invention now known or hereafter developed. FIGS. 1-3 show an embodiment wherein the fastener 36 is a zipper. The zipper fastener 36 has a first side 38 and a second side 40. In this embodiment, the zipper first side 38 is affixed to the upper compartment bottom section periphery edge 25 and the zipper second side 40 is affixed to the lower compartment bottom section periphery edge 57. In use, when the zipper first side 38 and the zipper second side 40 are zipped or otherwise matingly engaged, the lower compartment 42 remains in a collapsed state as shown in FIG. 1. When the user wishes to expand the lower compartment 42 so that it can be put into operation, the user unzips the zipper fastener 36 thereby disengaging the zipper first side 38 from the zipper second side 40. After the zipper first side 38 and zipper second side 40 are disengaged, the lower compartment 42 can then be expanded as shown in FIGS. 2-3.

Once the lower compartment 42 is in an expanded position, the user may place a granular material 116 in the lower compartment 42. As shown in FIGS. 2-3, the lower compartment front section 44 defines an opening 58 therethrough proximate the lower compartment front section top edge 46. It will be appreciated by one skilled in the art that the opening 58 can be utilized in any location on the lower compartment 42 that is suitable for the present invention or to accommodate the needs of the user. The lower compartment 42 also includes a fastener 60 for securing the lower compartment opening 58 in a closed position. The fastener 60 may be selected from the group consisting of zippers, hooks and loops, buttons, snaps, buckles, pins, clamps, combinations thereof, or any other fastener suitable for use in the present invention now known or hereafter developed. FIGS. 2-3 show an embodiment wherein the fastener 60 is a zipper. In use, when a user desires to place a granular material 116 in the lower compartment 42 of this embodiment, the user unzips the zipper fastener 60 thereby disengaging the zipper fastener 60. To close the opening 58, the user zips the zipper fastener 60 thereby matingly engaging the zipper fastener 60 and closing the opening 58.

Figure 4:
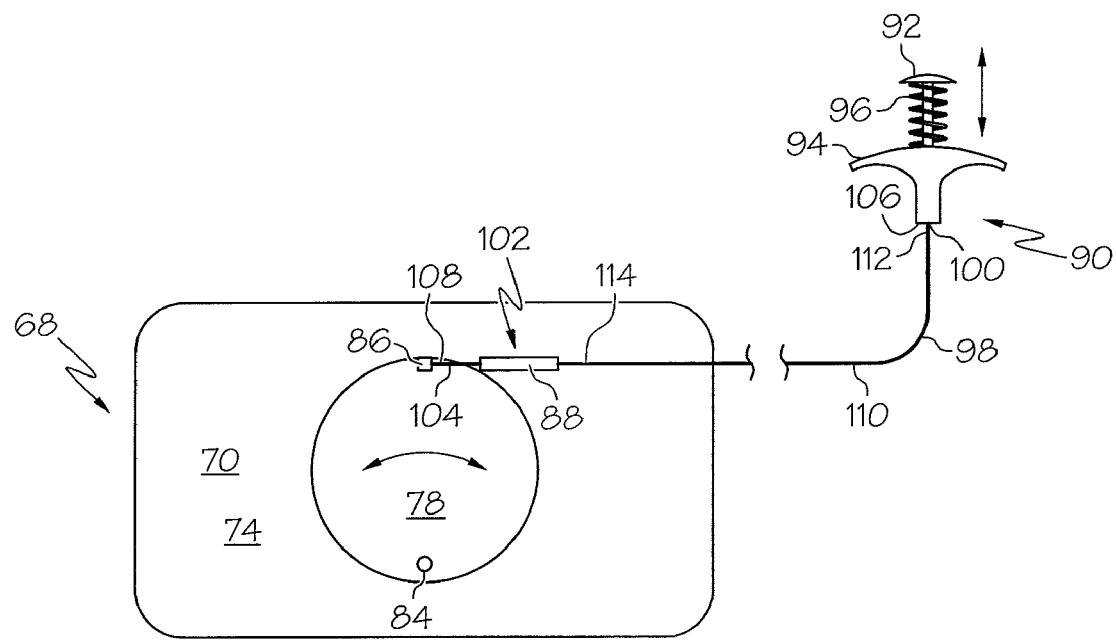
FIG. 4 is a bottom side view of a valve assembly showing the closure plate in a closed position in accordance with one embodiment of the present invention.
Figure 5:
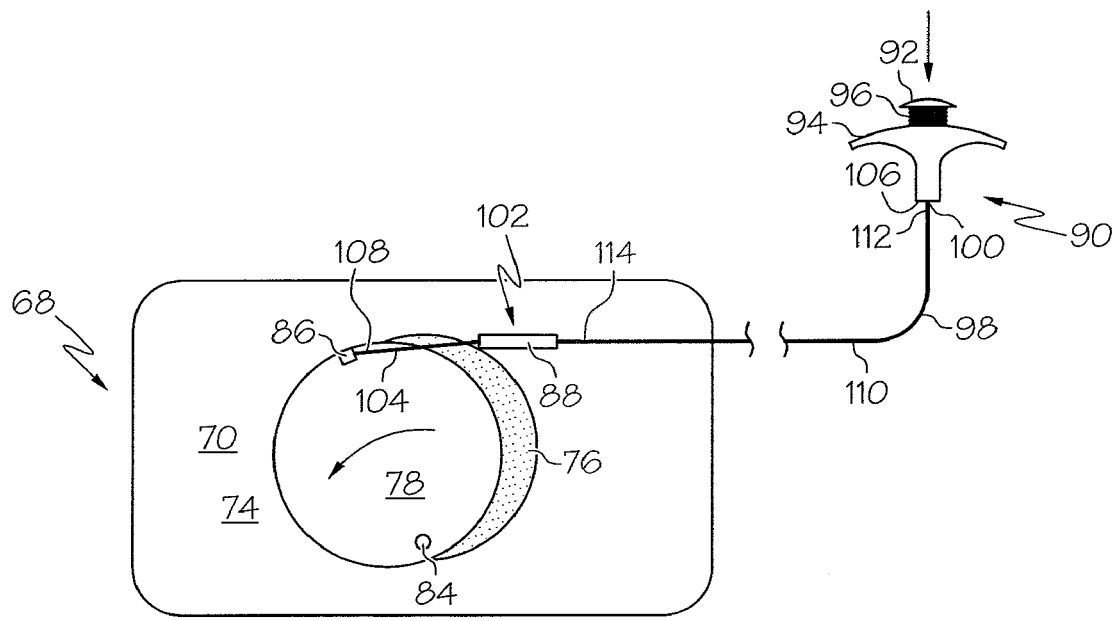
FIG. 5 is a bottom side view of the valve assembly of FIG. 4 showing the closure plate in a partially open position in accordance with one embodiment of the present invention.

As shown in FIGS. 4-5, the combination backpack and granular material dispenser 10 also includes a valve assembly 68 that is affixed to the lower compartment bottom section 52. The valve assembly 68 includes a substantially rectangular valve plate 70 and a substantially circular closure plate 78. The valve plate includes a top surface (not shown), a bottom surface 74, a pivot pin 84, and an aperture 76 defined therethrough. The closure plate 78 has a pivot aperture (not shown) configured to receive the pivot pin 84. The closure plate 78 is thereby pivotally coupled to the valve plate 70 by the pivot pin 84. In one embodiment of the present invention, the valve plate 70 is affixed to the lower compartment bottom section bottom surface 56. In this embodiment, the valve plate 70 is affixed to the lower compartment bottom section 50 such that its aperture 76 is in communication with an opening (not shown) extending through the lower compartment bottom section 50.

As shown in FIGS. 1-5, the combination backpack and granular material dispenser 10 also includes a valve assembly actuator 90 that remotely actuates the valve assembly 68. The valve assembly actuator 90 includes a push-button plunger 92, a handle 94, a coil spring 96, and a flexible control cable 98 having a first end 100 and a second end 102. The flexible control cable 98 also includes an inner core 104 having a first end 106 proximate the flexible control cable first end 100 and a second end 108 proximate the flexible control cable second end 102. The flexible control cable 98 also includes an outer conduit 110 having a first end 112 proximate the flexible control cable first end 100 and a second end 114 proximate the flexible control cable second end 102.

The push-button plunger 92 and flexible control cable first end 100 are axially aligned with the handle 94. The flexible control cable outer conduit first end 112 is affixed to the handle 94 and the flexible control cable inner core first end 106 is affixed to the push-button plunger 92. The flexible control cable inner core second end 108 is affixed to the closure plate 78 by a mount 86 and the flexible control cable outer conduit second end 114 is affixed to the valve plate 70 by a mount 88. Thus, when the push-button plunger 92 is depressed and/or released, the flexible control cable outer conduit 110 remains stationary relative to the handle 94 and the valve plate 70 while the flexible control cable inner core 104 moves relative to the handle 94 and the valve plate 70. This action allows the closure plate 78, which is pivotally coupled to the valve plate 70, to be selectively opened and closed through the remote actuation of depressing and/or releasing the push-button plunger 92.

The coil spring 96 retains the closure plate 78 in a closed position, as shown in FIG. 4, until it is overcome by a downward force applied to the push-button plunger 92. It will be appreciated by one skilled in the art that in substitution of or in addition to the coil spring, a spring, such as a torsion spring, may be located about the axis of the pivot pin 84 that is utilized to retain the closure plate 78 in a closed position. When the coil spring 96 is overcome by a downward force on the push-button plunger 92, as shown in FIG. 5, the closure plate 78 opens. As shown in FIG. 4, when the push-button plunger 92 is in a released position, the closure plate 70 is in a closed position therefore covering the entire valve plate aperture 76. As shown in FIG. 5, when the push-button plunger 92 is in a depressed position, the closure plate 70 is in an open position therefore allowing the granular material 116 to fall from the lower compartment 42. In use, when the user desires to partially open the valve plate 70, the user partially depresses the push-button plunger 92. The further the user depresses the push-button plunger 92, the further the valve plate 70 opens. This action, which controls the degree to which the valve plate 70 is open or closed, allows the user to control the rate of dispersal of the granular material 116.

From the foregoing, it may be seen that the combination backpack and granular material dispenser of the present invention is particularly well suited for the proposed usages thereof. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

We claim:

1. A combination backpack and granular material dispenser, the combination comprising:
   an upper compartment including a front section, a back section, a top section, and a bottom section;
   a lower compartment extending downwardly from said upper compartment bottom section, said lower compartment including a front section, a back section, and a bottom section;
   at least one carrying strap attached to said upper compartment back section;
   a valve assembly affixed to said lower compartment bottom section, said valve assembly having a valve plate and a closure plate pivotally coupled to said valve plate; and
   said valve assembly being actuatable by a valve assembly actuator having a push-button plunger, a handle, a coil spring and a flexible control cable having a first end and a second end.

2. The combination of claim 1, said lower compartment being collapsible into and expansible from said upper compartment.

3. The combination of claim 2 further comprising a fastener for retaining said lower compartment in a collapsed state.

4. The combination of claim 3, said fastener selected from the group consisting of zippers, hooks and loops, buttons, snaps, buckles, pins, clamps, and combinations thereof.

5. The combination of claim 3 wherein said fastener is a zipper comprising a first side and a second side.

6. The combination of claim 5, said zipper first side being affixed to an edge along a periphery of said upper compartment bottom section and said zipper second side being affixed to an edge along a periphery of said lower compartment bottom section.

7. The combination of claim 1, said upper compartment defining a first opening that passes through at least an exterior wall of the upper compartment and said lower compartment defining a second opening that passes through at least an exterior wall of the lower compartment.

8. The combination of claim 7 further comprising a fastener for securing said first opening in a closed state and a fastener for securing said second opening in a closed state.

9. The combination of claim 8, said fasteners selected from the group consisting of zippers, hooks and loops, buttons, snaps, buckles, pins, clamps, and combinations thereof.

10. The combination of claim 8 wherein said second opening is proximate a top edge of said lower compartment front section and said fastener for securing said second opening is a zipper.

11. The combination of claim 1 further comprising a second carrying strap attached to said upper compartment back section.

12. A combination backpack and granular material dispenser, the combination comprising:
   an upper compartment including a front section, a back section, a top section, and a bottom Section;
   a lower compartment extending downwardly from said upper compartment bottom section, said lower compartment including a front section, a back section, and a bottom section;
   at least one carrying strap attached to said upper compartment back section;
   a valve assembly affixed to said lower compartment bottom section, said valve assembly having a valve plate and a closure plate pivotally coupled to said valve plate;
   said valve assembly being actuatable by a valve assembly actuator having a push-button plunger, a handle, a coil spring and a flexible control cable having a first end and a second end; and
   said flexible control cable further comprising an inner core and outer conduit, said inner core moving independently of said outer core.

13. The combination of claim 12 wherein said push-button plunger and said flexible control cable first end are axially aligned with said handle, said push-button plunger being connected to said flexible control cable inner core having a first end, and said handle being connected to said flexible control cable outer conduit first end.

14. The combination of claim 13 wherein said flexible control cable outer conduit second end is affixed to said valve plate, and said flexible control cable inner core having a second end is affixed to said closure plate, such that said closure plate is in communication with and actuated by said push-button plunger.

15. The combination of claim 14 wherein said coil spring retains said closure plate in a closed position until overcome by downward force on said push-button plunger.

* * * * *